United States Patent
Hahmann et al.

(10) Patent No.: US 8,614,522 B2
(45) Date of Patent: Dec. 24, 2013

(54) ENERGY CONVERTING DEVICE

(75) Inventors: Wolfgang Hahmann, Kempen (DE);
Norbert Böhmer, Langerwehe (DE);
Daniel Thull, Stuttgart (DE); Frank Herold, Saarbrücken (DE)

(73) Assignee: Hydac System GmbH, Sulzbach/Saar (DE)

( * ) Notice: Subject to any disclaimer, the term of this patent is extended or adjusted under 35 U.S.C. 154(b) by 555 days.

(21) Appl. No.: 12/735,918

(22) PCT Filed: Feb. 5, 2009

(86) PCT No.: PCT/EP2009/000770
§ 371 (c)(1),
(2), (4) Date: Sep. 24, 2010

(87) PCT Pub. No.: WO2009/106213
PCT Pub. Date: Sep. 3, 2009

(65) Prior Publication Data
US 2011/0012368 A1    Jan. 20, 2011

(30) Foreign Application Priority Data
Feb. 26, 2008    (DE) .................. 10 2008 011 141

(51) Int. Cl.
*F03B 13/18* (2006.01)
*F16D 31/02* (2006.01)
(52) U.S. Cl.
USPC ................................. 290/54; 290/43; 60/398
(58) Field of Classification Search
USPC ............................. 290/42, 43, 53, 54; 60/398
See application file for complete search history.

(56) References Cited

U.S. PATENT DOCUMENTS

| | | | | |
|---|---|---|---|---|
| 4,158,780 A | * | 6/1979 | Wood | 290/42 |
| 4,277,690 A | * | 7/1981 | Noren | 290/53 |
| 6,226,989 B1 | * | 5/2001 | Fredriksson et al. | 60/501 |
| 6,300,689 B1 | | 10/2001 | Smalser | |
| 6,617,705 B1 | | 9/2003 | Smalser et al. | |
| 6,731,019 B2 | * | 5/2004 | Burns et al. | 290/42 |
| 6,748,737 B2 | * | 6/2004 | Lafferty | 60/398 |
| 6,768,216 B1 | * | 7/2004 | Carroll et al. | 290/42 |
| 6,772,592 B2 | * | 8/2004 | Gerber et al. | 60/495 |
| 7,302,799 B2 | * | 12/2007 | Ummenhofer | 60/468 |
| 2002/0047273 A1 | | 4/2002 | Burns et al. | |
| 2005/0167178 A1 | | 8/2005 | Johnson | |
| 2010/0207390 A1 | * | 8/2010 | Zimmermann et al. | 290/53 |

FOREIGN PATENT DOCUMENTS

| | | |
|---|---|---|
| DE | 28 09 300 A1 | 9/1979 |
| DE | 36 11 455 A1 | 10/1987 |
| DE | 197 45 747 A1 | 6/1998 |
| DE | 601 15 509 T2 | 7/2006 |
| DE | 10 2007 002 080 A1 | 11/2007 |
| DE | 10 2007 018 600 A1 | 10/2008 |
| WO | WO 2005/069824 A2 | 8/2005 |

* cited by examiner

*Primary Examiner* — Nicholas Ponomarenko
(74) *Attorney, Agent, or Firm* — Roylance, Abrams, Berdo & Goodman LLP

(57) ABSTRACT

An energy converting device, particularly for converting mechanical energy to hydraulic energy and from it into electrical energy, uses as an energy transport medium, a control fluid guided in two different control circuits. The control circuits have an operative connection to each other by a coupling device (32). One control circuit (28) serves for feeding in energy, particularly in the form of mechanical energy. The other control circuit serves for discharging energy in the form of converted energy, particularly electrical energy.

12 Claims, 4 Drawing Sheets

ENERGY CONVERTING DEVICE

FIELD OF THE INVENTION

The invention relates to an energy converting device, especially for conversion of mechanical energy into hydraulic energy and from the hydraulic energy into electrical energy.

BACKGROUND OF THE INVENTION

Renewable energy resources also include the energy of ocean waves, whose energy potential is estimated to be able to provide roughly 15% of worldwide power demand. Ocean waves inherently constitute a type of ocean movement which is less regular in terms of time and space, but no less energy-rich, such as, for example, the known motion of the tidal range.

The technical implementation for obtaining the energy from the ocean can be based on different principles. One possible implementation principle is based on a dual-mass system which floats in water. The two masses are used. As a result of the natural frequencies which are distinctly different from one another, the masses have different relative motions with respect to one another due to wave motion. These relative motions of the masses with respect to one another can be converted into pump motions of working cylinders, such as hydraulic cylinders, to then obtain, for example, by a generator, electrical energy. The hydraulic energy converts into usable current by the working cylinder, caused by mechanical energy in the form of wave motion.

DE 601 15 509 T2 discloses a pertinent, point-absorbing wave energy converting device for obtaining energy from wave motion on the surface of a body of liquid and with dimensions which are small compared to the wavelength of the predominant wave. The known solution has two devices which can move in relative terms opposite one another as two movable individual masses. The first device has a float. The second device has a submerged body underneath the surface of the body of liquid. Hydraulic working cylinders between these two mass devices execute lifting motions for energy transfer from mechanical into electrical energy due to the relative motion of the individual masses with respect to one another caused by the wave motion.

In these dual-mass systems which float in water, often a time offset is between the wave motion and the guided motion of at least one of the masses of the dual-mass system, with the result that mass motion can be stopped or at least decelerated. This time offset, for example, when the amplitude of the wave after passing through the wave trough rises again, while at least one of the two masses following in time is still in downward motion in the direction of the wave trough and then is slowed down or even stopped in this motion by the already rising wave. The energy conversion is adversely affected or even stopped by this "retarding moment." To counteract these failure phenomena, PCT-WO 2005/069824 A2 describes an energy converting device which makes it possible, with inclusion of the corresponding sensor technology, to briefly switch over a generator for current generation, caused by the wave motion, and a corresponding mechanical converter segment in the form of a rack and pinion drive, into motor operation. At least some of the energy obtained beforehand can then be used again to drive a mass which has been set in the direction of standstill dictated by the wave motion, such that the indicated dead point phases are overcome. Depending on the actual circumstances of the wave motion, the energy converting device can then be used either as a generator in the energy recovery mode or in motor operation as a driving control force for the respective mass of the energy converting device to ensure a basic situation of motion from which the mass can be moved more easily by the wave than if it assumes a decelerated state or even a rest state. In spite of the energy yield which is improved in this way, however, for driving the mass out of the respective wave dead point zone, energy is lost again in the motor operation of the device. Overall, this loss reduces the possible energy yield.

The magnitude, height, and frequency of wave motion are highly variable, as are the absolute values of the magnitudes of motion as well as the pertinent relative value of the body excited by it in the form of the individual movable masses. Due to the variable behavior of the wave motion, in practice the conversion of the mechanical energy associated with it into electrical energy poses problems, in the sense that uniform current delivery is not achieved, and/or as a result of feedback processes the "mechanical wave machine" is stopped by the respective working cylinders being stopped or at least greatly decelerated in their motion.

SUMMARY OF THE INVENTION

An object of the invention is to provide an improved energy converting device which is almost free of feedback and which can convert different forms of energy into one another with very good yield.

This object is basically achieved by an energy converting device according to the invention that uses as the energy transport medium a control fluid which is routed in two different control circuits which are dynamically connected to one another for energy transfer by a coupling device. One control circuit is used for energy supply, especially in the form of mechanical energy. The other control circuit is used for energy delivery in the form of converted energy, specifically electrical energy. By division into two different control circuits, the coupling device located between the circuits can be operated such that energy feed in one control circuit is separated from energy delivery in the other control circuit, at least to the extent that in their operation they do not mutually disrupt one another. Adverse feedback effects, particularly in the direction of energy feed for the converting device, are then reliably avoided.

Surprisingly for one with average skill in the art in the field of energy conversion in spite of using a coupling device requiring for its operation some of the energy to be converted, one arrives at improved energy transmission results in conversion. In particular, improved uniform delivery of electrical energy to the connected consumers, even in the form of battery ampere-hour capacities is also achieved. The converting device can also be economically implemented with its components and is reliable in use.

The energy converting device according to the invention need not be limited to use in wave energy systems. A host of possible applications is conceivable for example, in the field of wind power plants, in which mechanical rotor motions are to be converted into electrical current, with comparable problems as indicated above. The energy conversion chain can also be reversed in the sense that, for example, basic electrical energy is converted into mechanical energy without feedback using hydraulic energy as the intermediate medium.

In one preferred embodiment of the energy converting device according to the invention, the coupling device has a hydraulic motor connected to one control circuit by a gear connection with a definable transmission ratio, which can even be 1:1. The motor drives a first hydraulic pump with a variable stroke volume, which pump is connected to the other control circuit. As a result of the variable stroke volume of the hydraulic pump, the pump is driven by the hydraulic motor only to the extent that, caused by the wave energy, the control fluid as an energy transport medium in this case can also deliver energy. Specifically, the energy-delivering control circuit is adjusted in terms of its output performance according to the wave-mass model. In a corresponding manner, in one preferred embodiment, energy delivery and energy transport in the second control circuit are then controlled by a hydraulic motor with a triggerable, variable stroke volume.

Other objects, advantages and salient features of the present invention will become apparent from the following detailed description, which, taken in conjunction with the annexed drawings, disclose a preferred embodiment of the present invention.

BRIEF DESCRIPTION OF THE DRAWINGS

Referring to the drawings which form a part of this disclosure and which are schematic and not scale.

DETAILED DESCRIPTION OF THE INVENTION

Figure 1:
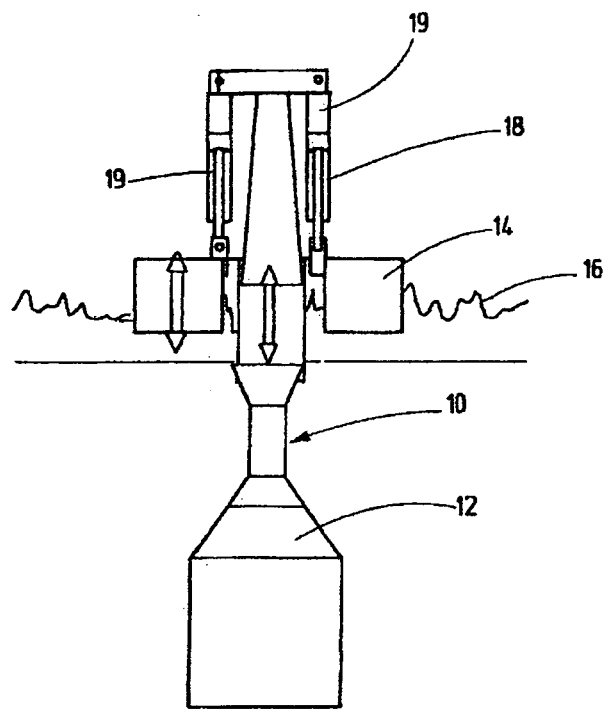
FIG. 1 is a side elevational view of the fundamental structure of a converting device for converting mechanical wave energy into hydraulic energy according to an exemplary embodiment of the invention.

The converting unit 10 in FIG. 1, is made in the form of a floating buoy and, in addition to a post float (12), has a toroidal or ring float 14. As a result of different natural frequencies, depending on the excitation, the two bodies execute relative motion. The different mass motion which accompanies different wave motion is relayed to a displacer device 18 of individual hydraulic working cylinders 19 connected on their piston side to the post float 12 and on their rod side to the ring float 14. This converting unit 10, is shown by example in FIG. 3 in a control diagram as a spring-mass oscillator with the corresponding cushioning element, wave passage being detected by way of example according to path (x-wave) and speed (v-wave) as a cumulative input signal in a symbolically depicted block diagram 20.

As a result of the different motions of the post float 12 with respect to the ring float 14, for the displacer device 18, a pumping motion of the individual hydraulic working cylinders 19 occurs. The hydraulic energy obtained thereby can in principle be supplied to a hydraulic motor which could directly drive a generator for producing electrical energy. This direct drive, however, leads to the aforementioned feedback and stability problems. Fundamentally, the following formula relationships apply:

Energy: $W = \int F \cdot ds$

Power: $dW/dt = F \cdot v$ $dW/dt = p \cdot A \cdot v$

Figure 2:
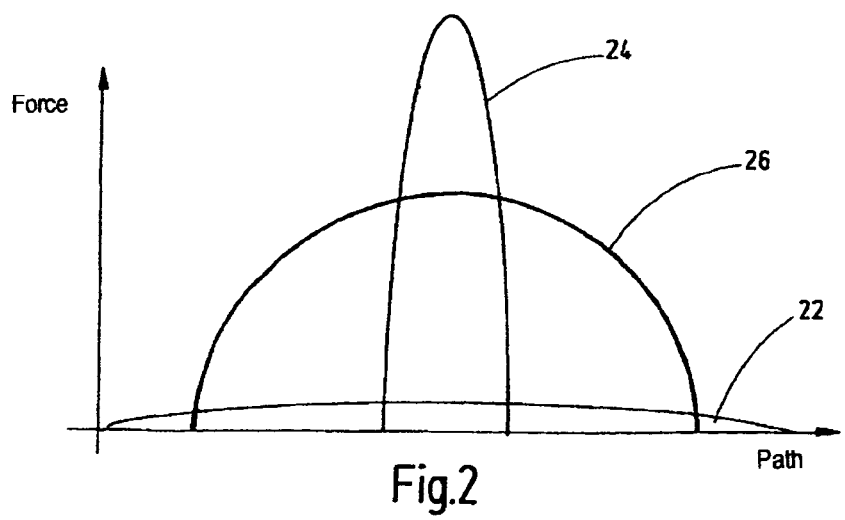
FIG. 2 is a work diagram of the respective work capacity of the converting device of FIG. 1, plotted in a force-path diagram.

On the one hand, the force F of a cylinder 19 is proportional to the pressure p which acts on its piston surface and which is produced by the load resulting from the opposite relative motion between the post float 12 and the ring float 14. On the other hand, the power which can be obtained from the wave energy by the opposite relative motions of the masses M1 and M2 depends on various factors, particularly on the energy content of the partners involved. The determining factors are the selected mass and the individual speeds achieved. If, for example, the actuating pistons of the individual cylinders 19 can be pumped almost without force, then as shown in FIG. 2, a maximum stroke is produced, but the pressure which can be generated is almost zero, and the power and the energy which can be obtained therefrom are close to zero. This curve characteristic is designated as 22 in FIG. 2. The pressure is maximum due to the very high or excessive force, but cylinder motion in itself is blocked; i.e., the desired relative motion approaches zero, and likewise the energy which can be produced with it is also close to zero. This situation is qualitatively designated as 24 in the diagram as a curve characteristic, as shown in FIG. 2.

The maximum possible energy recovery therefore lies between these two extremes, i.e., at an average force on the piston of the cylinder 19 which allows a sufficiently large relative stroke. This average force only moderately reduces the motion not being constant, but rather arising as a function of relative velocity when the energy content of the wave is to be used as optimally as possible. The effect of this operation is that the force, like the relative velocity, must change during a stroke, with the pertinently optimum energy curve 26 being produced as an average between the extreme curves 22 and 24 (cf. FIG. 2). As a result of this actual wave model, meaningful energy withdrawal in the form of electrical energy using a hydraulic motor connected directly to the control circuit in addition to a generator would hardly make sense. Feedback or a reaction could lead to shutdown of the wave energy receiving device in the form of the converting unit 10. The control devices detailed below are designed to be used to essentially ensure the pertinently optimized energy curve 26 in the operation of the converting device.

Figure 3:
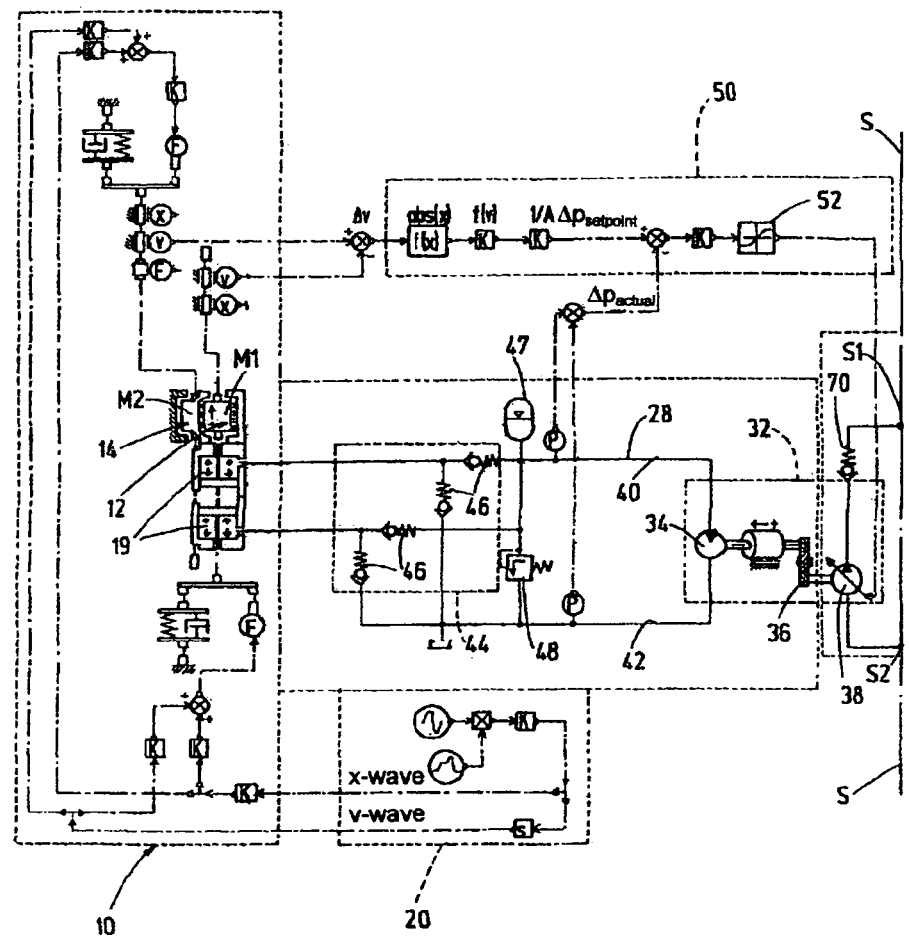
FIGS. 3 and 4 are hydraulic circuit diagrams of energy converting device, including the converting unit, of FIG. 1, divided along an imaginary intersection line S-S into two component figures with different scales.
Figure 4:
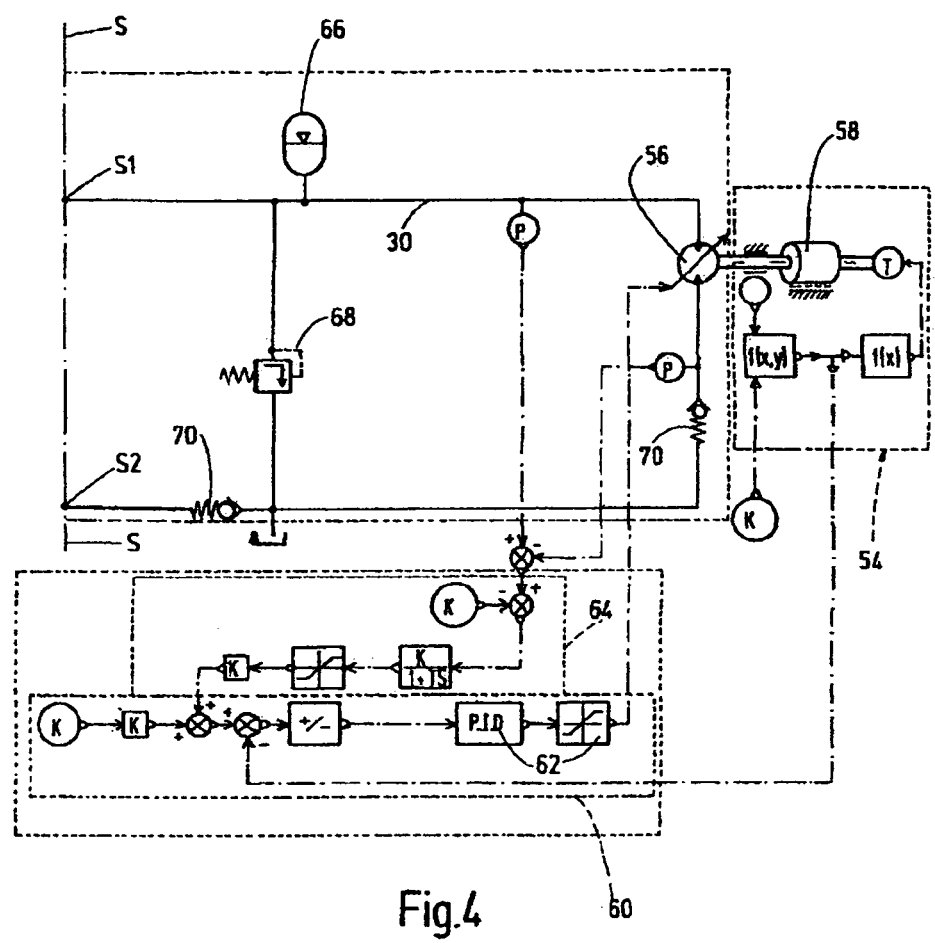
Figure 5:
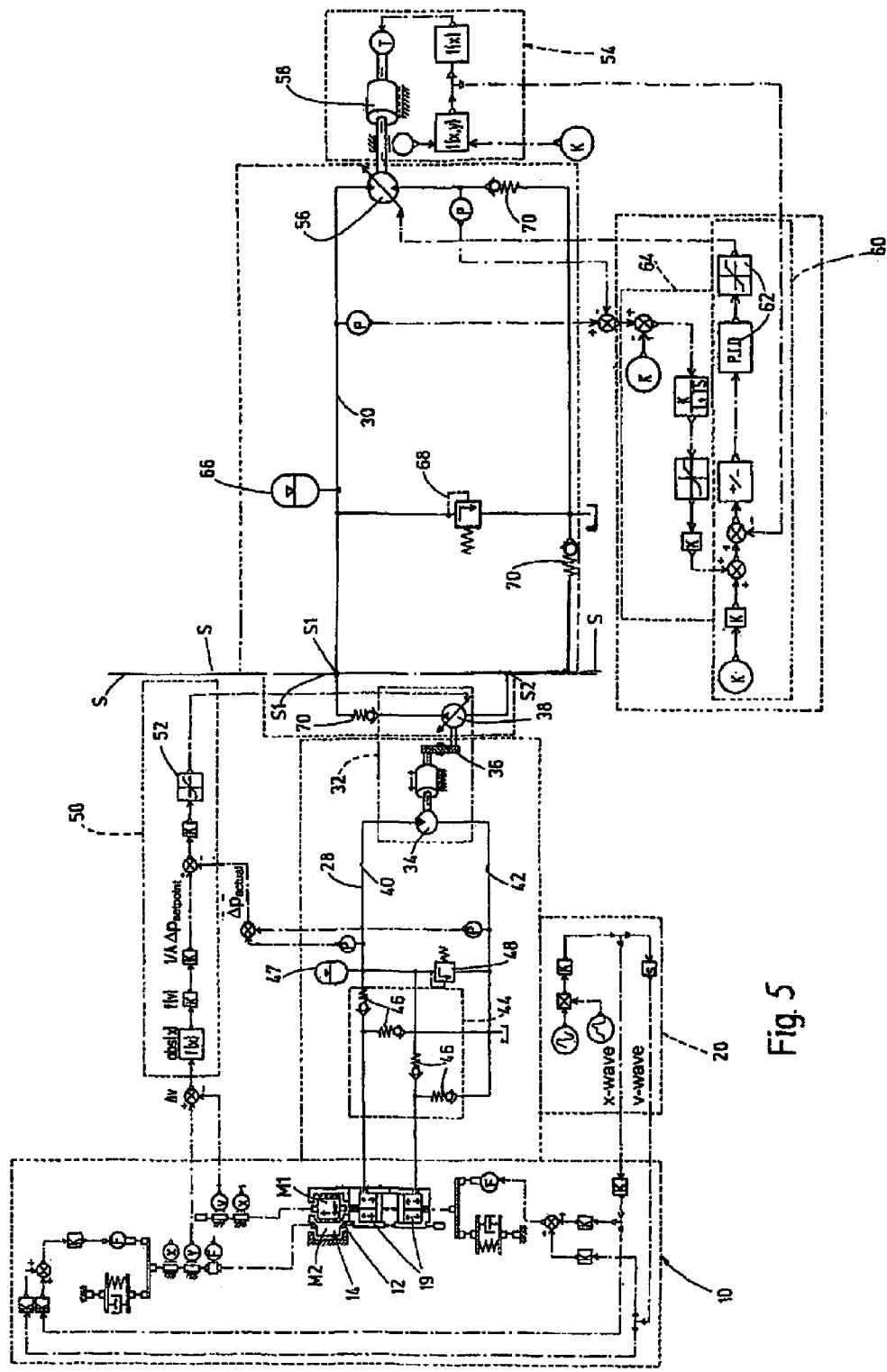
FIG. 5 is a schematic hydraulic diagram combining FIGS. 3 and 4.

At this point, the energy converting device will be detailed below using the circuit diagram as shown in FIGS. 3 and 4. FIGS. 3 and 4 along the intersection line S-S and the two nodal points combine to show the converting device as a whole. Division into the two figures with the different scales is done for improved representation. As already described, the energy converting device in this exemplary embodiment is used for conversion of mechanical wave energy into hydraulic energy and from the hydraulic energy into electrical energy. The energy transport medium is a control fluid, especially in the form of a control oil or hydraulic oil. This control fluid is routed in two different control circuits 28, 30, with FIG. 3 showing the first control circuit 28 and with FIG. 4 showing the second control circuit 30.

The two control circuits 28, 30 are dynamically connected to one another specifically by a coupling device 32 used for energy transfer. One or first control circuit 28 is used for energy supply, especially in the form of mechanical wave energy. The other or second control circuit 30 is used to deliver energy in the form of electrical energy obtained from the hydraulic energy. The coupling device 32 has a hydraulic motor 34 connected to the first control circuit 28 to carry fluid. As shown in FIG. 3, the hydraulic motor 34 is located on the opposite side of the control circuit 28 relative to the converting unit 10. The hydraulic motor 34 is furthermore connected to a first hydraulic pump 38 by a conventional gear connection 36 with a definable transmission ratio. The pump has an adjustable, variable stroke volume, as shown in FIG. 3. The gear connection 36 is not, however, critically necessary for the operation of the invention. The pertinent hydraulic pump 38 is connected to the second control circuit 30 to carry fluid and in this respect circulates the control fluid of the second control circuit 30.

As already described, to feed energy into a first control circuit 28 a first converting unit 10 converts the mechanical wave energy into hydraulic energy by the first converting unit 10 actuating the displacer device 18 with the individual hydraulic working cylinders 19. The respective working cylinders 19, depending on the direction of motion, pump the fluid in the control circuit 28 back and forth in opposite directions. The control fluid of the first control circuit 28 is therefore supplied by the displacer device 18 in opposite directions to the component circuits 40, 42 of the first control circuit 28. To the extent that the component circuits 40, 42 are addressed here, they also relate to the respective component fluid guidance upstream of a Graetz circuit 44. The volume of the respective working cylinder 19 displaced, by analogy to electrical engineering, is rectified by the Graetz circuit 44 as a rectifier circuit. The Graetz circuit is implemented by four spring-loaded nonreturn valves 46 as shown in FIG. 3.

Viewed in the direction of FIG. 3, the upper component circuit 40 connected is a conventional hydraulic accumulator 47 used to compensate for leaks and/or cavitation phenomena and, like the Graetz circuit 44, is protected by a pressure limitation valve 48 relative to the lower component circuit 42. The Graetz circuit 44 at least ensures that the hydraulic motor 34 is driven only in one direction. The motor enables hydraulic power delivery from the first control circuit 28 to the second control circuit 30 by the gearing 36. Altogether the gearing 36 is made in the manner of a hydrostatic transmission. To trigger the hydraulic pump 38 from 0% to 100% delivery volume amount, a first control 50 is used for optimum power removal of the wave energy from the first converting unit 10.

The regulator 52 used is provided with a saturation curve and adjusts the $\Delta p_{actual}$ value to a definable $\Delta p_{setpoint}$ value, the $\Delta p_{actual}$ value resulting from the difference of the pressures in the component circuits 40, 42 of the first control circuit 28 and the $\Delta p_{setpoint}$ value following from the $\Delta v$ value which represents the resulting, changing velocity difference with respect to the relative motion of the masses M1 and M2 of the post float 12 and the ring float 14. It would be possible to include other, sensor-detected characteristics of the converting unit 10 into the control here, such as the distance traversed x or the force applied F, etc. With the illustrated control, the mechanical wave energy present at the time is always optimally converted into hydraulic drive energy for the second control circuit 30. Based on ambient conditions, a closed system is preferably used here. In an open system also only one pressure sensor P of the hydraulic first control circuit 28 is sufficient to accordingly arrive at an input quantity for the first control 50.

For energy delivery from the other, second control circuit 30, a second converting unit 54 in FIG. 4 is used to converts hydraulic energy into electrical energy. The second converting unit 54 has another displacement device in the form of a hydraulic motor 56 which drives the generator 58 to produce electrical energy. For this conversion of hydraulic energy into electrical energy, a second control device 60 made in the manner of a slip control ensures optimum power delivery to the electrical network. In particular, the output of the second control device 60 is connected to the hydraulic motor 56 such that its stroke volume can be varied in a controlling manner. The regulator 62 of the second control unit 60 is a PID-regulator with a connected saturation curve. To implement the indicated slip control, among other things the reference quantity is the torque (T) of the generator 68 and its shaft rpm w.

With the indicated slip control it is possible to keep the electrical output power of the generator 68 at an optimum output point regardless of the actual power input quantity with respect to the power output of the hydraulic pump 38 with a variable stroke volume. To implement the variable stroke volume of the hydraulic pump 38 and hydraulic motor 56, an inclined cam plate is conventionally used whose effective degree of tilt can be stipulated by the respective control device.

In one especially preferred embodiment, this slip control as shown in FIG. 4 is superimposed by feed-forward control 64 of the hydraulically available power which as the input value picks up by two pressure sensors P the pressure difference $\Delta p$ in the component circuits of the second control circuit 30 upstream and downstream of the hydraulic pump 56 acting in both actuating directions. This pressure difference $\Delta p$ is used as an indicator for the available hydraulic energy relative to the second control circuit 30. The hydraulic motor 56 and the generator 58 are designed for a specific maximum flow rate, which is ultimately dictated by the hydraulic working cylinders 19 of the first displacer device 18. Otherwise, a system which is made open would also be possible for the two circuits.

If the flow rate decreases, for example as a result of smaller wave motion on the first converting unit 10, to this same extent the control pressure in the second control circuit 30 will also decrease. This driving pressure for the hydraulic motor 56 can then drop to low values such that cavitation occurs, which can lead to shutdown of the entire energy converting device in a reaction. In order to manage this problem, the indicated slip control is superimposed by the above-indicated feed-forward control 64 with the result that, provided the flow rate falls back, the hydraulic motor 56 is triggered such that it also requires only a smaller flow rate. The output power for the generator 68 then decreases, but without shutdown phenomena of the entire converting device occurring. In this case the control 60, 64 therefore allows setting of the electrical output power of the generator 68 for the most varied wave amplitudes relative to the input side in the form of the first converting unit 10.

The second control circuit 30 can also be provided with a hydraulic accumulator unit 66 for purposes of storing hydraulic energy. The second control circuit 30 is also protected by a pressure limitation valve 68. The illustrated nonreturn valves 70 of the second circuit are used to ensure that vibrations of the hydraulic circuit cannot occur or that backflow in the wrong direction for the control fluid of the second circuit 30 does not accidentally occur.

The solution according to the invention need not be limited to use in wave energy systems, but can also be used, for example, for other energy systems, such as wind power plants and the like. Thus, for example, a hydraulic working pump, which is not detailed, can convert the mechanical energy of the output shaft of a wind power plant accordingly into hydraulic energy of the first control circuit 28 and in this case replace the described hydraulic working cylinder 19. It would also be possible to make available mechanical energy on the first converting unit 10 with as little loss as possible in the reverse direction to the one shown in FIG. 4 proceeding from the second electrical converting unit 54 in the reverse direction.

The above-described exemplary embodiment of an energy converting device fundamentally manages even without a Graetz circuit. In this case, however, the hydraulic pump used can be swiveled in both directions. It then undertakes rectification, and absolute-value generation in the regulator is eliminated. Instead of the sensor information of the relative speed, a volumetric flow sensor in the control circuit 28 or the rotary speed (tachogenerator) of the hydraulic motor 34 can also be analogously used. This arrangement has the advantage that the sensor is not exposed to rough ambient conditions.

As already described, for the sake of simplicity FIGS. 3 and 4 show only the open system with a tank. By replacing the tank with another accumulator (not shown) a closed system can be created which is especially advantageous for rough ambient conditions. The accumulator in FIG. 3 can be connected to the second component circuit 42 instead of the illustrated tank in the region of reference number 44. The corresponding hydraulic accumulator in FIG. 4 would be used instead of the tank shown there between the nonreturn valves 70 and the pressure limitation valve 68.

While one embodiment has been chosen to illustrate the invention, it will be understood by those skilled in the art that various changes and modifications can be made therein without departing from the scope of the invention as defined in the appended claims.

What is claimed is:

1. A water wave energy converting device for converting mechanical motion energy into a hydraulic pressure energy and the hydraulic pressure energy into an electrical energy, comprising:
    a control fluid as an energy transport medium routed in two different control circuits dynamically connected to one another for energy transfer by a coupling device;
    a first control circuit for energy extraction from mechanical motion of waves into hydraulic pressure energy; and
    a second control circuit for energy conversion from the hydraulic pressure energy to electrical energy.

2. A water wave energy converting device according to claim 1 wherein
    the coupling device comprises a hydraulic motor connected to the first control circuit and drives a hydraulic pump, the pump being connected to the second control circuit.

3. A water wave energy converting device according to claim 2 wherein
    the hydraulic pump has a variable stroke volume.

4. A water wave energy converting device according to claim 1 wherein
    a first converting unit converts the mechanical motion into the hydraulic pressure energy to supply hydraulic pressure energy to the first control circuit.

5. A water wave energy converting device according to claim 4 wherein
    the first converting unit comprises a displacer device having at least one of a drivable working pump and an actuatable hydraulic cylinder.

6. A water wave energy converting device according to claim 5 wherein
    the control fluid is suppliable by the displacer device in opposite directions to two component circuits of the first control circuit.

7. A water wave energy converting device according to claim 6 wherein
    the control fluid is fed in opposite directions to the component circuits by the displacer device via a rectifier circuit for rectification of the control fluid.

8. A water wave energy converting device according to claim 7 wherein
    said rectifier circuit comprises a Graetz circuit implemented by nonreturn valves.

9. A water wave energy converting device according to claim 3 wherein
    with including control quantities of the first control circuit and a mechanical reference system delivering mechanical motion energy to the first converting unit, a first control unit triggers the variable stroke volume of the hydraulic pump of the second control circuit.

10. A water wave energy converting device according to claim 1 wherein
    the second control circuit comprises a second converting unit converting the hydraulic pressure energy into electrical energy.

11. A water wave energy converting device according to claim 10 wherein
    the second converting unit comprises a second displacer device having at least one hydraulic motor driving a generator for producing electrical energy.

12. A water wave energy converting device according to claim 10 wherein
    a second control unit triggers a variable stroke volume of a hydraulic motor in the second control circuit, with including control quantities of the second control circuit and of an electrical reference system withdrawing electrical energy from the second converting unit as part thereof.

* * * * *